UNITED STATES PATENT OFFICE 2,290,758

TRICHLOROSTYRENE AND METHOD OF PREPARING THE SAME

Arthur A. Levine and Oliver W. Cass, Niagara Falls, N. Y., assignors to E. I. du Pont de Nemours & Company, Wilmington, Del., a corporation of Delaware No Drawing. Application March 18, 1940, Serial No. 324,616

7 Claims. (Cl. 260—650)

This invention relates to the preparation of valuable chlorinated aromatic compounds. More particularly, it relates to the preparation of trichlorostyrene from ethyltrichlorobenzene as a starting material. The present application is a continuation-in-part of our copending application Serial No. 136,024, filed April 9, 1937, which is directed to the preparation of pentachlorostyrene from ethylpentachlorobenzene.

Ethyltrichlorobenzene is readily prepared by the nuclear chlorination of ethylbenzene. The chlorination is carried out in the absence of light and in the presence of a chlorine carrier which is metallic iron. The trichloride is separated by distillation from the dichlorides and tetrachlorides which are formed in small amounts. The product thus obtained is a mixture of the six possible isomers of ethyltrichlorobenzene.

Our process for the preparation of trichlorostyrene from ethyltrichlorobenzene involves two steps. In the first step, ethyltrichlorobenzene is reacted with chlorine under conditions such that mono-chlorethyltrichlorobenzene is formed. In the second step, the mono-chlorethyltrichlorobenzene is converted to trichlorostyrene by splitting off hydrogen chloride from the side chain.

Accordingly, one of the objects of this invention involves the preparation of trichlorostyrene from ethyltrichlorobenzene in satisfactory yield. Another object is the preparation of the desired product, trichlorostyrene, by means of a two-stage process involving two separate chemical reactions. The first of these reactions involves the preparation of mono-chlorethyltrichlorobenzene, and the second, the conversion of that product to trichlorostyrene.

The various isomers of trichlorostyrene represented by the formula $C_6H_2Cl_3.CH=CH_2$ are believed to be new compounds never before described in the chemical literature. It is, therefore, a further object of this invention to produce these new chemical compounds. Other objects and advantages of the invention will be apparent from the ensuing detailed disclosure.

In order to convert ethyltrichlorobenzene to mono-chlorethyltrichlorobenzene, the ethyltrichlorobenzene starting material may be reacted with chlorine in the presence of light and in the absence of any chlorine carrier until approximately 50% of the amount of chlorine theoretically required for the introduction of one chlorine atom per mole of ethyltrichlorobenzene has been added. This gives a mixture of approximately 50% unchanged ethyltrichlorobenzene and 50% mono-chloroethyltrichlorobenzene. If much more than 50% of the theoretical chlorine is added, the yields are decreased due to the formation of higher chlorides. The reaction involved is represented by the following equation:

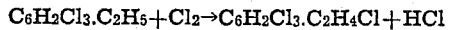

$$C_6H_2Cl_3.C_2H_5 + Cl_2 \rightarrow C_6H_2Cl_3.C_2H_4Cl + HCl$$

The mixture of unchanged ethyltrichlorobenzene and chlorethyltrichlorobenzene may be separated into its constituents by vacuum distillation. In the course of the distillation, it is important that the temperature does not exceed 150° C. as the chlorethyltrichlorobenzene undergoes decomposition at higher temperatures.

Trichlorostyrene is most conveniently prepared from the chlorethyltrichlorobenzene simply by distillation at atmospheric pressure. At the temperature of distillation, the chlorine atom in the ethyl side chain is released as hydrogen chloride, converting the chlorethyl group to a vinyl group and thus forming trichlorostyrene. The reaction is as follows:

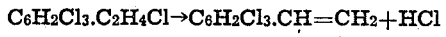

$$C_6H_2Cl_3.C_2H_4Cl \rightarrow C_6H_2Cl_3.CH=CH_2 + HCl$$

Alternatively the chlorethyltrichlorobenzene may be converted to trichlorostyrene by treatment of the former with a base as, for example, alcoholic potassium hydroxide, or the removal of one molecule of HCl from the chlorethyl side chain of chlorethyltrichlorobenzene may be effected by means of any of the other usual dehydrohalogenation treatments known in the art.

The invention may be further illustrated by the specific procedure described in the following example:

EXAMPLE

Preparation of ethyltrichlorobenzene

A mixture of the isomers of ethyltrichlorobenzene was prepared in the following manner:

1146 grams (10.8 moles) of ethylbenzene was placed in a two-liter, three-necked flask fitted with a stirrer, a thermometer, an inlet tube for chlorine and a reflux condenser leading to a scrubbing system for absorbing the evolved hydrogen chloride. Iron filings in the amount of 55 grams were then added to the flask and operation of the stirrer begun. Chlorine gas was then passed in and the temperature of the reaction vessel was maintained below 30° C. at all times by externally cooling the flask. The flask and its contents were carefully screened from light during the chlorination period. After 1150 grams (31.6 moles) of hydrogen chloride had been absorbed by the scrubbing system the chlorination was stopped. The amount of chlorine absorbed corresponded to 2.93 moles of chlorine for each mole of ethylbenzene. The reaction mixture was then decanted from the iron catalyst, washed once with water, once with a solution of sodium bicarbonate, again with water and then dried.

The major portion of the product, when distilled, was found to have boiling points within the range 235 to 250° C. This fraction consisted principally of the various isomers of ethyltrichlorobenzene.

Conversion of ethyltrichlorobenzene to monochlorethyltrichlorobenzene 838 grams (4 moles) of ethyltrichlorobenzene was charged into a reaction vessel equipped with a stirrer, a chlorine inlet tube, a thermometer, and a reflux condenser leading to a hydrogen chloride trap containing water. The reaction vessel was illuminated by means of an incandescent lamp.

The ethyltrichlorobenzene was then heated to about 100–120° C. and 150 grams (2.1 moles) of chlorine was gradually introduced. During the course of the reaction, 73 grams of hydrogen chloride was evolved and the gain in weight of the contents of the flask was approximately 72 grams.

The reaction mixture was then vacuum-distilled under an absolute pressure of 10 mm. of mercury. The portion distilling below a temperature of 127° C. consisted principally of unchanged ethyltrichlorobenzene. The fraction distilling between 130 and 152° C. consisted essentially of a mixture of the isomers of mono-chlorethyltrichlorobenzene. The product had a density of 1.445 at 20° C. and a melting point below −40° C.

Conversion of mono-chlorethyltrichlorobenzene to trichlorostyrene

The mixture of mono-chlorethyltrichlorobenzene isomers, as obtained by the procedure described above, was distilled at atmospheric pressure, then re-distilled a second and third time, and finally blown with air until no further hydrogen chloride could be removed. The final product had a density of 1.425 at 30° C., a freezing point below −40° C. and had a boiling range of 260–300° C., approximately 70% boiling within the range 260–280° C. and 20% within the range 280–300° C. The product was essentially a mixture of the six possible isomers of trichlorostyrene.

Trichlorostyrene as prepared above differs markedly from unchlorinated styrene. It is a remarkably stable material and shows no tendency to polymerize under the action of either light or heat.

Because of its stability, low melting point and other desirable properties, trichlorostyrene is adapted for use either alone or in combination with other materials for such varied purposes as dielectric media for electrical apparatus, media for transferring heat at elevated temperatures, brake fluids and hydraulic brake systems, extreme pressure lubricants, absorbents in scrubbing systems, cooling agents for internal combustion agents, etc.

It is to be understood that our invention is not restricted to the specific embodiments described hereinabove, but includes all such modifications, variations, and equivalents, as fall within the scope of the appended claims.

We claim:

1. A process for preparing trichlorostyrene which comprises chlorinating ethyltrichlorobenzene to form monochlorethyltrichlorobenzene and subjecting said monochlorethyltrichlorobenzene to dehydrochlorination conditions, thereby removing one mole of hydrogen chloride and forming trichlorostyrene.

2. A process for preparing trichlorostyrene which comprises reacting ethyltrichlorobenzene with chlorine in the absence of a halogenation catalyst, but in the presence of light, to form mono-chlorethyltrichlorobenzene and then subjecting said mono-chlorethyltrichlorobenzene to dehydrochlorination conditions to form trichlorostyrene.

3. A process of preparing trichlorostyrene which comprises reacting ethyltrichlorobenzene with chlorine in the absence of a halogenation catalyst, but in the presence of light to form mono-chlorethyltrichlorobenzene and then pyrolytically decomposing said monochlorethyltrichlorobenzene to form trichlorostyrene.

4. A process for preparing trichlorostyrene from mono-chlorethyltrichlorobenzene which comprises subjecting said mono-chlorethyltrichlorobenzene to dehydrochlorination conditions, thereby removing one mole of hydrogen chloride per pole of mono-chlorethyltrichlorobenzene.

5. A process for preparing trichlorostyrene which comprises subjecting mono-chlorethyltrichlorobenzene to thermodecomposition, thereby removing one mole of hydrogen chloride per mole of mono-chlorethyltrichlorobenzene.

6. Trichlorostyrene.

7. A composition comprising essentially mixed isomers of trichlorostyrene.

ARTHUR A. LEVINE.
OLIVER W. CASS.